US008075384B2

(12) United States Patent
Jones et al.

(10) Patent No.: US 8,075,384 B2
(45) **Date of Patent: *Dec. 13, 2011**

(54) WAGERING GAMING DEVICE HAVING SIMULATED CONTROL OF MOVEMENT OF GAME FUNCTIONAL ELEMENTS

(75) Inventors: Aaron T. Jones, Reno, NV (US); Nicole M. Beaulieu, Reno, NV (US); Lance R. Peterson, Reno, NV (US)

(73) Assignee: IGT, Reno, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 12/835,478

(22) Filed: Jul. 13, 2010

(65) Prior Publication Data

US 2011/0159944 A1 Jun. 30, 2011

Related U.S. Application Data

(63) Continuation of application No. 10/243,899, filed on Sep. 13, 2002, now Pat. No. 7,789,756.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl. .................. 463/16; 463/7; 463/20; 463/30

(58) Field of Classification Search ................ 463/7, 16, 463/20, 30

See application file for complete search history.

(56) References Cited

U.S. PATENT DOCUMENTS

| | | | |
|---|---|---|---|
| 1,912,992 | A | 6/1933 | Mills |
| 3,796,433 | A | 3/1974 | Fraley et al. |
| 3,853,324 | A | 12/1974 | Reiner et al. |
| 3,877,700 | A | 4/1975 | Moe |
| 3,923,305 | A | 12/1975 | Reiner et al. |
| 4,012,046 | A | 3/1977 | Liket |
| 4,129,304 | A | 12/1978 | Mager |
| 4,198,052 | A | 4/1980 | Gauselmann |
| 4,353,554 | A | 10/1982 | Fisher |
| 4,363,485 | A | 12/1982 | Edwall |
| 4,373,727 | A | 2/1983 | Hooker et al. |
| 4,550,916 | A | 11/1985 | Ortiz |
| 4,582,324 | A | 4/1986 | Koza et al. |

(Continued)

FOREIGN PATENT DOCUMENTS

EP 375190 A2 6/1990

(Continued)

OTHER PUBLICATIONS

Cyclone advertisements, by Innovative Concepts in Entertainment, Inc., published prior to Sep. 13, 2002.

(Continued)

*Primary Examiner* — Melba Bumgarner
*Assistant Examiner* — Jason Pinheiro
(74) *Attorney, Agent, or Firm* — K&L Gates LLP

(57) ABSTRACT

A wagering gaming device that enables a player to affect the movement of a functional element of a game by use of a user input device. More specifically, the present invention provides a processor controlled wagering gaming device that receives input from a user input device. The user manipulates the input device in the manner in which he wishes the functional element or to move. The processor receives the information from the input device and calculates parameters. The processor moves the functional element. This sequence or feature may be employed in a primary game, bonus game or in any stand alone game.

18 Claims, 11 Drawing Sheets

U.S. PATENT DOCUMENTS 4,586,707 A 5/1986 McNeight et al.
4,593,904 A 6/1986 Graves
4,615,527 A 10/1986 Moss
4,618,150 A 10/1986 Kimura
4,652,998 A 3/1987 Koza et al.
4,666,160 A 5/1987 Hamilton
4,695,053 A 9/1987 Vazquez, Jr. et al.
4,712,799 A 12/1987 Fraley
4,756,532 A 7/1988 Kamille
4,773,647 A 9/1988 Okada et al.
4,781,377 A 11/1988 McVean et al.
4,790,537 A 12/1988 Smyth et al.
4,805,907 A 2/1989 Hagiwara
4,871,171 A 10/1989 Rivero
4,926,327 A 5/1990 Sidley
4,936,588 A 6/1990 Rader et al.
4,948,133 A 8/1990 Helm et al.
4,964,642 A 10/1990 Kamille
5,001,632 A 3/1991 Hall-Tipping
5,083,271 A 1/1992 Thacher et al.
5,083,800 A 1/1992 Lockton
5,114,155 A 5/1992 Tillery et al.
5,116,055 A 5/1992 Tracy
5,205,555 A 4/1993 Humano
5,241,139 A 8/1993 Gungl et al.
5,280,909 A 1/1994 Tracy
5,299,810 A 4/1994 Pierce et al.
5,308,065 A 5/1994 Bridgeman et al.
5,340,317 A 8/1994 Freeman
5,342,047 A 8/1994 Heidel et al.
5,342,049 A 8/1994 Wichinsky et al.
5,342,058 A 8/1994 Giovannetti
5,364,100 A 11/1994 Ludlow et al.
5,397,125 A 3/1995 Adams
5,409,225 A 4/1995 Kelly et al.
5,411,268 A 5/1995 Nelson et al.
5,411,271 A 5/1995 Mirando
5,429,507 A 7/1995 Kaplan
5,449,173 A 9/1995 Thomas et al.
5,472,197 A 12/1995 Gwiasda et al.
5,531,440 A 7/1996 Dabrowski et al.
5,536,016 A 7/1996 Thompson
5,542,669 A 8/1996 Charron et al.
5,544,892 A 8/1996 Breeding
5,560,603 A 10/1996 Seelig et al.
5,611,535 A 3/1997 Tiberio
5,618,045 A 4/1997 Kagan et al.
5,628,684 A 5/1997 Bouedec
5,643,088 A 7/1997 Vaughn et al.
5,645,281 A 7/1997 Hesse et al.
5,645,486 A 7/1997 Nagao et al.
5,647,798 A 7/1997 Falciglia
5,655,965 A 8/1997 Takemoto et al.
5,667,217 A 9/1997 Kelly et al.
5,669,818 A 9/1997 Thorner et al.
5,676,371 A 10/1997 Kelly et al.
5,695,188 A 12/1997 Ishibashi
5,697,611 A 12/1997 Kelly et al.
5,700,007 A 12/1997 Kelly et al.
5,700,008 A 12/1997 Lawlor et al.
5,704,612 A 1/1998 Kelly et al.
5,707,285 A 1/1998 Place et al.
5,722,891 A 3/1998 Inoue
5,733,193 A 3/1998 Allard et al.
5,743,523 A 4/1998 Kelly et al.
5,743,532 A 4/1998 Lafferty
5,755,621 A 5/1998 Marks et al.
5,758,875 A 6/1998 Giacalone, Jr.
5,766,074 A 6/1998 Cannon et al.
5,769,424 A 6/1998 Kelly et al.
5,769,716 A 6/1998 Saffari et al.
5,772,509 A 6/1998 Weiss
5,779,544 A 7/1998 Seelig et al.
5,785,595 A 7/1998 Gauselmann
5,788,573 A 8/1998 Baerlocher et al.
5,796,389 A 8/1998 Bertram et al.
5,803,451 A 9/1998 Kelly et al.
5,810,354 A 9/1998 Banyai
5,816,918 A 10/1998 Kelly et al.
5,818,430 A 10/1998 Heiser
5,823,872 A 10/1998 Prather et al.
5,823,874 A 10/1998 Adams
5,833,536 A 11/1998 Davids et al.
5,836,586 A 11/1998 Marks et al.
5,848,932 A 12/1998 Adams
5,851,148 A 12/1998 Brune et al.
5,860,648 A 1/1999 Petermeier et al.
5,871,398 A 2/1999 Schneier et al.
5,873,781 A 2/1999 Keane
5,882,258 A 3/1999 Kelly et al.
5,882,261 A 3/1999 Adams
5,888,115 A 3/1999 Shoemaker, Jr. et al.
5,910,046 A 6/1999 Wada et al.
5,911,418 A 6/1999 Adams
5,919,088 A 7/1999 Weiss
5,927,714 A 7/1999 Kaplan
5,934,672 A 8/1999 Sines et al.
5,941,770 A 8/1999 Miers et al.
5,947,820 A 9/1999 Morro et al.
5,951,397 A 9/1999 Dickinson
5,967,514 A 10/1999 Kelly et al.
5,976,015 A 11/1999 Seelig et al.
5,993,315 A 11/1999 Strider et al.
5,997,400 A 12/1999 Seelig et al.
5,997,401 A 12/1999 Crawford
6,007,426 A 12/1999 Kelly et al.
6,012,722 A 1/2000 Petermeier et al.
6,015,344 A 1/2000 Kelly et al.
6,015,346 A 1/2000 Bennett
6,017,033 A 1/2000 Keller
6,019,369 A 2/2000 Nakagawa et al.
6,019,374 A 2/2000 Breeding
6,030,291 A 2/2000 Maki et al.
6,033,307 A 3/2000 Vancura
6,047,963 A 4/2000 Pierce et al.
6,048,271 A 4/2000 Barcelou
6,050,895 A 4/2000 Luciano, Jr. et al.
6,062,981 A 5/2000 Luciano, Jr. et al.
6,071,192 A 6/2000 Weiss
6,086,066 A 7/2000 Takeuchi et al.
6,089,976 A 7/2000 Schneider et al.
6,089,977 A 7/2000 Bennett
6,102,400 A 8/2000 Scott et al.
6,102,402 A 8/2000 Scott et al.
6,102,798 A 8/2000 Bennett
6,110,039 A 8/2000 Oh
6,110,041 A 8/2000 Walker et al.
6,110,043 A 8/2000 Olsen
6,113,098 A 9/2000 Adams
6,117,007 A 9/2000 Matsuyama et al.
6,117,008 A 9/2000 Machiguchi
6,120,031 A 9/2000 Adams
6,125,385 A 9/2000 Wies et al.
6,126,541 A 10/2000 Fuchs
6,126,542 A 10/2000 Fier
6,126,547 A 10/2000 Ishimoto
6,135,453 A 10/2000 Srichayaporn
6,135,884 A 10/2000 Hedrick et al.
6,135,885 A 10/2000 Lermusiaux
6,139,013 A 10/2000 Pierce et al.
6,142,873 A 11/2000 Weiss et al.
6,146,273 A 11/2000 Olsen
6,149,156 A 11/2000 Feola
6,152,821 A 11/2000 Nakagawa et al.
6,159,095 A 12/2000 Frohm et al.
6,159,097 A 12/2000 Gura
6,159,098 A 12/2000 Slomiany et al.
6,162,121 A 12/2000 Morro et al.
6,165,070 A 12/2000 Nolte et al.
6,169,595 B1 1/2001 Manne
6,174,233 B1 1/2001 Sunaga et al.
6,174,235 B1 1/2001 Walker et al.
6,174,237 B1 1/2001 Stephenson
6,190,255 B1 2/2001 Thomas et al.
6,193,606 B1 2/2001 Walker et al.
6,201,533 B1 3/2001 Rosenberg et al.
6,210,279 B1 4/2001 Dickinson

| | | | |
|---|---|---|---|
| 6,219,032 | B1 | 4/2001 | Rosenberg et al. |
| 6,220,593 | B1 | 4/2001 | Pierce et al. |
| 6,220,961 | B1 | 4/2001 | Keane et al. |
| 6,224,482 | B1 | 5/2001 | Bennett |
| 6,224,483 | B1 | 5/2001 | Mayeroff |
| 6,224,484 | B1 | 5/2001 | Okuda et al. |
| 6,224,485 | B1 | 5/2001 | Dickinson et al. |
| 6,227,971 | B1 | 5/2001 | Weiss |
| 6,231,442 | B1 | 5/2001 | Mayeroff |
| 6,234,897 | B1 | 5/2001 | Frohm et al. |
| 6,238,288 | B1 | 5/2001 | Walker et al. |
| 6,251,013 | B1 | 6/2001 | Bennett |
| 6,254,481 | B1 | 7/2001 | Jaffe |
| 6,261,177 | B1 | 7/2001 | Bennett |
| 6,267,669 | B1 | 7/2001 | Luciano, Jr. et al. |
| 6,270,408 | B1 | 8/2001 | Sakamota et al. |
| 6,270,410 | B1 | 8/2001 | DeMar et al. |
| 6,270,411 | B1 | 8/2001 | Gura et al. |
| 6,270,412 | B1 | 8/2001 | Crawford et al. |
| 6,279,910 | B1 | 8/2001 | De Keller |
| 6,287,194 | B1 | 9/2001 | Okada et al. |
| 6,287,197 | B1 | 9/2001 | Dickinson et al. |
| 6,290,603 | B1 | 9/2001 | Luciano, Jr. |
| 6,293,866 | B1 | 9/2001 | Walker et al. |
| 6,296,568 | B1 | 10/2001 | Tracy |
| 6,302,790 | B1 | 10/2001 | Brossard |
| 6,308,953 | B1 | 10/2001 | Nagano |
| 6,309,299 | B1 | 10/2001 | Weiss |
| 6,309,300 | B1 | 10/2001 | Glavich |
| 6,312,334 | B1 | 11/2001 | Yoseloff |
| 6,315,660 | B1 | 11/2001 | Demar et al. |
| 6,315,663 | B1 | 11/2001 | Sakamoto |
| 6,322,309 | B1 | 11/2001 | Thomas et al. |
| 6,328,649 | B1 | 12/2001 | Randall et al. |
| 6,338,678 | B1 | 1/2002 | Seelig et al. |
| 6,340,158 | B2 | 1/2002 | Pierce et al. |
| 6,343,988 | B1 | 2/2002 | Walker et al. |
| 6,346,043 | B1 | 2/2002 | Colin et al. |
| 6,347,996 | B1 | 2/2002 | Gilmore et al. |
| 6,364,765 | B1 | 4/2002 | Walker et al. |
| 6,364,766 | B1 | 4/2002 | Anderson et al. |
| 6,364,768 | B1 | 4/2002 | Acres et al. |
| 6,366,272 | B1 | 4/2002 | Rosenberg et al. |
| 6,375,187 | B1 | 4/2002 | Baerlocher |
| 6,379,245 | B2 | 4/2002 | De Keller |
| 6,386,974 | B1 | 5/2002 | Adams |
| 6,406,369 | B1 | 6/2002 | Baerlocher et al. |
| 6,413,160 | B1 | 7/2002 | Vancura |
| 6,413,161 | B1 | 7/2002 | Baerlocher et al. |
| 6,435,511 | B1 | 8/2002 | Vancura et al. |
| 6,443,837 | B1 | 9/2002 | Jaffe et al. |
| 6,450,884 | B1 | 9/2002 | Seelig et al. |
| 6,454,649 | B1 | 9/2002 | Mattice et al. |
| 6,454,651 | B1 | 9/2002 | Yoseloff |
| 6,464,581 | B1 | 10/2002 | Yoseloff et al. |
| 6,467,519 | B1 | 10/2002 | Owen |
| 6,476,798 | B1 | 11/2002 | Bertram et al. |
| 6,485,367 | B1 | 11/2002 | Joshi |
| 6,488,580 | B1 | 12/2002 | Robb |
| 6,506,118 | B1 | 1/2003 | Baerlocher et al. |
| 6,517,433 | B2 | 2/2003 | Loose et al. |
| 6,522,312 | B2 | 2/2003 | Ohshima et al. |
| 6,533,660 | B2 | 3/2003 | Seelig et al. |
| 6,537,150 | B1 | 3/2003 | Luciano et al. |
| 6,554,704 | B2 | 4/2003 | Nicastro et al. |
| 6,563,487 | B2 | 5/2003 | Martin et al. |
| 6,572,473 | B1 | 6/2003 | Baerlocher |
| 6,582,306 | B1 | 6/2003 | Kaminkow |
| 6,599,193 | B2 | 7/2003 | Baerlocher et al. |
| 6,602,137 | B2 | 8/2003 | Kaminkow et al. |
| 6,605,000 | B2 | 8/2003 | Adams |
| 6,605,002 | B2 | 8/2003 | Baerlocher |
| 6,607,438 | B2 | 8/2003 | Baerlocher et al. |
| 6,626,756 | B2 | 9/2003 | Sugimoto |
| 6,632,140 | B2 | 10/2003 | Berman et al. |
| 6,632,141 | B2 | 10/2003 | Webb et al. |
| 6,645,071 | B2 | 11/2003 | Perrie et al. |
| 6,648,754 | B2 | 11/2003 | Baerlocher et al. |
| 6,656,040 | B1 | 12/2003 | Brosnan et al. |
| 6,663,448 | B1 | 12/2003 | Davies et al. |
| 6,692,003 | B2 | 2/2004 | Potter et al. |
| 6,722,976 | B2 | 4/2004 | Adams |
| 6,733,386 | B2 | 5/2004 | Cuddy et al. |
| 6,739,970 | B2 | 5/2004 | Luciano |
| 6,761,632 | B2 | 7/2004 | Bansemer et al. |
| 6,767,284 | B1 | 7/2004 | Koza |
| 6,769,983 | B2 | 8/2004 | Slomiany |
| 6,780,103 | B2 | 8/2004 | Bansemer et al. |
| 6,780,111 | B2 | 8/2004 | Cannon et al. |
| 6,786,824 | B2 | 9/2004 | Cannon |
| 6,811,482 | B2 | 11/2004 | Letovsky |
| 6,817,948 | B2 | 11/2004 | Pascal et al. |
| 6,827,646 | B2 | 12/2004 | Adams |
| 6,832,959 | B2 | 12/2004 | Baerlocher |
| 6,837,793 | B2 | 1/2005 | McClintic |
| 6,852,027 | B2 | 2/2005 | Kaminkow et al. |
| 6,863,606 | B1 | 3/2005 | Berg et al. |
| 6,893,342 | B1 | 5/2005 | Singer et al. |
| 6,942,571 | B1 | 9/2005 | McAllister et al. |
| 7,056,210 | B2 | 6/2006 | Bansemer et al. |
| 7,175,524 | B2 | 2/2007 | Bansemer et al. |
| 7,192,344 | B2 | 3/2007 | Baerlocher |
| 7,226,358 | B2 | 6/2007 | Miller et al. |
| 7,479,067 | B2 | 1/2009 | Gibson et al. |
| 2002/0049084 | A1 | 4/2002 | Hugh-Baird et al. |
| 2002/0107065 | A1 | 8/2002 | Rowe |
| 2002/0128055 | A1 | 9/2002 | Adams |
| 2002/0130847 | A1 | 9/2002 | Conzola et al. |
| 2002/0151342 | A1 | 10/2002 | Tracy et al. |
| 2002/0160825 | A1 | 10/2002 | Nicastro et al. |
| 2003/0013519 | A1 | 1/2003 | Bennett |
| 2003/0064773 | A1 | 4/2003 | Baerlocher et al. |
| 2003/0076307 | A1 | 4/2003 | Krajewski et al. |
| 2003/0104854 | A1 | 6/2003 | Cannon |
| 2003/0104860 | A1 | 6/2003 | Cannon et al. |
| 2003/0114218 | A1 | 6/2003 | McClintic |
| 2003/0114219 | A1 | 6/2003 | McClintic |
| 2003/0114220 | A1 | 6/2003 | McClintic |
| 2003/0119576 | A1 | 6/2003 | McClintic et al. |
| 2003/0119581 | A1 | 6/2003 | Cannon et al. |
| 2003/0125102 | A1 | 7/2003 | Cannon |
| 2003/0125107 | A1 | 7/2003 | Cannon |
| 2003/0171144 | A1 | 9/2003 | Letovsky |
| 2003/0199306 | A1 | 10/2003 | Parker |
| 2003/0232640 | A1 | 12/2003 | Walker et al. |
| 2004/0048659 | A1 | 3/2004 | Seelig et al. |
| 2004/0116173 | A1 | 6/2004 | Baerlocher |
| 2004/0116174 | A1 | 6/2004 | Baerlocher et al. |
| 2004/0198490 | A1 | 10/2004 | Bansemer et al. |
| 2005/0020340 | A1 | 1/2005 | Cannon |
| 2005/0026664 | A1 | 2/2005 | Bansemer et al. |
| 2005/0181853 | A1 | 8/2005 | Baerlocher |

FOREIGN PATENT DOCUMENTS

| | | |
|---|---|---|
| GB | 1 242 298 | 8/1971 |
| GB | 2 072 395 | 2/1981 |
| GB | 2 066 991 | 7/1981 |
| GB | 2 097 160 | 12/1981 |
| GB | 2 100 905 | 1/1983 |
| GB | 2 180 682 | 4/1987 |
| GB | 2 182 186 | 5/1987 |
| GB | 2 191 030 | 12/1987 |
| GB | 2 207 268 | 1/1989 |
| GB | 2 226 436 | 6/1990 |
| GB | 2 242 300 | 9/1991 |
| GB | 2 258 164 | 2/1993 |
| GB | 2 262 642 | 6/1993 |
| JP | 8047582 | 2/1996 |
| JP | 2002000939 | 1/2002 |
| NZ | 508626 | 11/2001 |
| WO | WO 96/25725 | 8/1996 |
| WO | WO 98/00210 | 1/1998 |
| WO | WO 98/51384 | 11/1998 |

OTHER PUBLICATIONS

Description of Poker written by Hoyle's Rules of Games published 1946-1983.

Diamond Dash web page http://www.arcadeplanet.com/images/diamond_dash.jpg written by Arcade Planet, Inc., printed on Mar. 31, 2004.
Fey, Slot Machines, A Pictorial History of the First 100 Years, Liberty Belle Books, 1983, pp. 215, 219.
Final Office Action dated Apr. 27, 2006 for U.S. Appl. No. 10/243,899.
Final Office Action dated May 17, 2007 for U.S. Appl. No. 10/243,899.
Final Office Action dated Aug. 7, 2008 for U.S. Appl. No. 10/243,899.
Final Office Action dated Aug. 10, 2009 for U.S. Appl. No. 10/243,899.
The Inside Straight article written by IT, published in 2002.
Introducing the Hottest Video Games on the Nile written by Aristocrat Technologies, published Oct. 2000.
Jackpot Party brochure and article published by WMS Gaming Inc. in 1998.
Legato, Frank; "Instant SLOTTO", Strictly Slots; Apr. 2001, pp. 70-72.
Mikohn Ripley's Believe It or Not article written by Strictly Slots, published in Jun. 2001.
Mountain Coin Machine Distributing—Redemption Games—Cyclone™ from www.mountaincoin.com printed Feb. 28, 2002.
Non-Final Office Action dated Sep. 20, 2005 for U.S. Appl. No. 10/243,899.
Non-Final Office Action dated Aug. 31, 2006 for U.S. Appl. No. 10/243,899.
Non-Final Office Action dated Oct. 29, 2007 for U.S. Appl. No. 10/243,899.
Non-Final Office Action dated Mar. 11, 2009 for U.S. Appl. No. 10/243,899.
Poker Speed Change Input Screens by IGT, available prior to 2002.
Press Your Luck article by Strictly Slots, dated 2000.
Primetime Amusements Redemption Games advertisement, printed from http://www.primetimeamusements.com/redemption.htm on Feb. 28, 2002.
Reel Spin Stop Input Screens by IGT, available prior to 2002.
Table Games advertisement brochure, published by ShuffleMaster in 2000.
Tickets'n'Tunes from www.rgb.com printed on Feb. 28, 2002.
Weiner Distributing ICE Cyclone™ from www.winerd.com. printed on Feb. 28, 2002.
"Welcome to the Real Touch" Roulette Brochure by Atronic Casino Technology, Inc., Aug. 1999.
Megatouch XL, The Game People Play! article, Merit Industries, available prior to Sep. 13, 2002. (3 pages).
Megatouch XL, The Game People Play, article, Merit Industries, available prior to Sep. 13, 2002. (4 pages).
Megatouch 5, The Power of Mega Link by Merit Industries, available prior to Sep. 13, 2002. (2 pages).
Magical Touch II Touch the Future Today! Speed Triva and Hat Trick, by Micro Manufacturing, available prior to Sep. 13, 2002. (2 pages).
Megatouch XL Extreme Multi-Game Video, Merit Industries, Inc., available prior to Sep. 13, 2002. (7 pages).
Maxx Championship Edition, Merit Industries, Inc., available prior to Sep. 13, 2002. (2 pages).
Megatouch Millennium, Merit Industries, Inc., available prior to Sep. 13, 2002. (2 pages).
Megalink for Maxx, Merit Industries, Inc., available prior to Sep. 13, 2002. (2 pages).
Tournament Megatouch Video, Merit Industries, Inc., available prior to Sep. 13, 2002. (1 page).
GT2001 Version 2.4, Micro Manufacturing, Inc., available prior to Sep. 13, 2002. (1 page).
Global Touch HD, Micro Manufacturing, Inc., available prior to Sep. 13, 2002. (2 pages).
Williams Now Brings Sensational Games to the Tip of Your Finger, Williams Electronics, Inc., available prior to Sep. 13, 2002. (3 pages).
The Next Champ in Hand to Hand Competition, Tournament Edition, Midway Amusement Games, available prior to Sep. 13, 2002. (1 page).
Touch Master, designed by Midway Amusement Games, available prior to Sep. 13, 2002. (4 pages).
Touch Master 4000, Midway Amusement Games, available prior to Sep. 13, 2002. (4 pages).
Touchmaster 8000, Midway Amusement Games, available prior to Sep. 13, 2002. (1 page).
System Megatouch, Tourna Maxx Get Connected, Raising Your Route!, Merit Industries, Inc., available prior to Sep. 13, 2002. (4 pages).
Maxx-2K Plus, The Newest Maxx, Merit Industries, Inc., available prior to Sep. 13, 2002. (3 pages).

WAGERING GAMING DEVICE HAVING SIMULATED CONTROL OF MOVEMENT OF GAME FUNCTIONAL ELEMENTS

PRIORITY CLAIM

This application is a continuation of, claims priority to and the benefit of U.S. patent application Ser. No. 10/243,899 filed on Sep. 13, 2002, the entire contents of which are incorporated by reference herein.

BACKGROUND

Wagering gaming devices are well known. Players operate and interact with known wagering gaming devices by performing certain actions such as pressing buttons, pulling levers and touching designated areas of touch screens. Many players enjoy wagering games with increased player interaction. However, in many known wagering gaming devices, the player's input does not affect the outcome of the game. For example, when a player presses a button or pulls a lever to spin a set of reels in a slot machine game, the result is not based on the player's action. Rather, the game outcome is based on a random determination. Additionally, the movement of a game element is not based on how the player pushed the button or pulled the lever or arm (i.e., how fast or slow, how hard or soft). In other words, the actuation or movement of these control features do not affect the movement of the reels or the eventual outcome. Certain known wagering gaming devices include stop buttons which enable the player to stop one or more of the reels. The outcome of many of these devices and the movement of these game elements are still randomly determined. Similarly, Pachiinko machines enable a player to introduce a marble into a display at a certain velocity to control the travel or path of the marble.

The use of a touch screen in wagering gaming devices increases or appears to increase player interaction. The player contacts the touch screen to input commands for the wagering gaming device. For example, in a video poker game, a player may contact the area of the touch screen in which a particular card is displayed in order to hold the card. When the player contacts the touch screen, the touch screen controller of the wagering gaming device sends a signal to the processor which determines which card the player is selecting or manipulating based on the point or points of contact. Thus, the player may experience increased interaction with the wagering gaming device. However, this interaction is limited solely to the isolated contacts with the touch screen when inputting commands. The physical engagement of the touch screen by the player does not affect the outcome of the game.

In other wagering games, it may appear to a player that he or she has some control over the outcome of the wagering game. In wagering games such as video poker, blackjack and keno, the player employs his or her own strategy while playing the game. For example, in video poker, the player may choose a second set of cards to be distributed based on a first set of cards initially distributed or dealt to the player. In blackjack, the player may or may not request additional cards based on the initial cards distributed or dealt to the player. In both of these wagering games, however, the eventual outcome is still randomly determined based on cards distributed to the player, other players, or the house. In keno, the player attempts to match as many entries as possible with the selections of the house. The player may employ a strategy in how those entries are chosen; however, the eventual outcome is based on the random distribution of selections.

Additionally, wagering gaming device manufacturers have developed base or primary and bonus or secondary games which require increased player input and interaction. Providing a player with increased interaction with functional game elements provides added entertainment to a player. However, despite providing wagering games with increased player interaction, known wagering gaming devices have not addressed the limitation of unvaried actuation of a control feature to operate functional game elements such as a set of reels or a set of cards.

It is therefore desirable to provide a wagering gaming device which provides players with greater control over functional game elements and provides a more realistic feel to wagering gaming devices by enabling varied actuation of a control device while maintaining random outcomes.

SUMMARY

The present invention provides a wagering gaming device which enables a player to affect the movement of a functional element of a game during game play. More specifically, the present invention provides a processor-controlled wagering gaming device having a player input device connected to or in communication with the processor of the wagering gaming device. The input device generates a signal based on the player's actuation or activation of the input device. The processor receives the signal and actuates the functional game element or mechanical functional element in correlation to the type of signal or information encoded in the signal. Despite the manner in which the functional game element or mechanical functional element is actuated, the outcome of the game remains randomly determined. This type of player interaction may be employed in a bonus or secondary wagering game, in a base or primary wagering game or in any stand alone wagering game.

In one embodiment, the functional game element is moved through the use of an input device in the form of a touch screen. The display device includes a video monitor with a touch screen. The video monitor displays at least one functional game element, such as a reel, a card, a die or a wheel displaying a set of awards. The touch screen is defined by a uniform electric field. Electrodes spread out the voltage that is applied to the four corners of the screen. The touch screen is connected to and communicates with the processor of the wagering gaming device through a touch screen controller. The touch screen controller detects any contact with the touch screen and determines the coordinates of the touch screen which are contacted. The touch screen controller sends a signal or plurality of signals to the processor that represent the contacted coordinates. The processor calculates or determines the type of contact the player has with the touch screen based on the plurality of signals received from the touch screen controller. For example, the processor is able to determine the speed at which the touch screen is contacted, as well as the direction in which the touch screen is contacted. The processor calculates the time of the actuation and also determines the distance and direction of the actuation. The processor calculates the speed by dividing the distance by the time of the actuation. The processor moves the functional game element in correlation to these calculated parameters.

In one embodiment, the display device which includes a touch screen displays a set of video reels of a slot machine game. Using a member, such as a rod or finger, the player contacts the touch screen in an area in which the reels are displayed. The player remains in contact with the touch screen while dragging the member to a last point of touch below the first point of touch. The touch screen controller detects the contact with the various coordinates of the touch screen. In one embodiment, the touch screen controller detects the contact with the first coordinate, the last coordinate and each coordinate in between and sends the signals with this information to the processor. The processor receives these signals and uses this information to calculate the speed and the direction of the movement between the first coordinate and last coordinate. The processor spins the video reels based on these parameters. For example, if the member was moved in a downward direction, the reels spin in a downward direction. In one example, the player drags the member in a relatively quick manner, and the processor causes the video reels to spin rapidly. The game is then played in a manner consistent with conventional wagering gaming devices, with the outcome being randomly determined.

In an alternative embodiment of the present invention, the touch screen is mounted or positioned in front of a mechanical device (instead of a video monitor) such as a reel, a plurality of reels, a wheel, a plurality of wheels, a die, dice, one or more objects such as balls, or any other physically actuatable device. The actuation of the touch screen causes actuation of the mechanical device as described above with respect to the touch screen. This provides a direct link or connection between the input device or touch screen and the mechanical device(s) or member(s) which in one embodiment is operable to display one or more symbols from a plurality of symbols.

In one alternative embodiment, the input device includes a motion detector which detects the movement by the player. The motion detector detects the proximity of the member to the input device. Thus, the input and calculations by the processor can be based on the time and distances the player moves the member within a proximity of the input device to actuate the input device. It should also be appreciated that in an alternative embodiment of the present invention, the motion detector could detect a movement of a player and cause a game event or function to occur. For instance, in an attract mode, the gaming device could sense movement by a player in front of the machine and cause the actuation of a game element or function such as the reels to spin, wheels to rotate or dice to move.

In one alternative embodiment, the input device is a mouse. In one example of this embodiment, the display device displays a set of video reels. A player positions the mouse such that a cursor, representing the position of the mouse on the display device, is positioned on one of the video reels. The player then presses a button on the mouse to represent a first coordinate. The player drags the mouse in a downward direction to a last coordinate while keeping the button pressed. The processor calculates the direction and speed based on the signals received from the mouse and spins the video reels in a manner consistent with the parameters. It should be appreciated that the input device may be any other suitable input device such as a light pen, a touch pad, keyboard, buttons touch pad or joystick.

In one embodiment, the player uses the input device to actuate an mechanical functional element located remote from the display device. The mechanical functional element is connected to and controlled by the processor. In one example, a mechanical wheel is positioned on the top box of the wagering gaming device. The mechanical wheel is connected to and controlled by the processor. The display device, which includes a touch screen, displays a video image, such as an indicator strip which distinguishes an area along the display device across which the player may contact the strip to actuate the mechanical wheel. The player uses a member, such as a finger, to contact at least a first coordinate of the touch screen in an area in which the strip is displayed. The player moves the member to a last coordinate of the strip. The touch screen controller sends the signals that represent the contacted coordinates to the processor. The processor calculates the speed and direction of the actuation and spins the mechanical wheel in correlation to the parameters. It should be appreciated that other images or devices could be used to enable the player to select positions on the touch screen. It should also be appreciated that other mechanical devices such as reels could also be activated in this manner.

In one embodiment the player moves the member back and forth before causing the movement in one direction. In this case, the video reels move back and forth as the member moves back and forth and then in the desired direction based on calculations made by the processor. In this embodiment, the movement of the actuated member is directly linked to the actuation of the input device. This intermediate movement provides the player with the feeling of substantial involvement in the gaming device.

It is therefore an advantage of the present invention to provide a wagering gaming device which enables a player to effectuate the movement of a functional game element or an mechanical functional element of the wagering gaming device through the use of an input device while maintaining random outcomes.

Additional features and advantages of the present invention are described in, and will be apparent from, the following Detailed Description of the Invention and the Figures.

DETAILED DESCRIPTION OF THE INVENTION

Wagering Gaming Device and Electronics

Figure 1A:
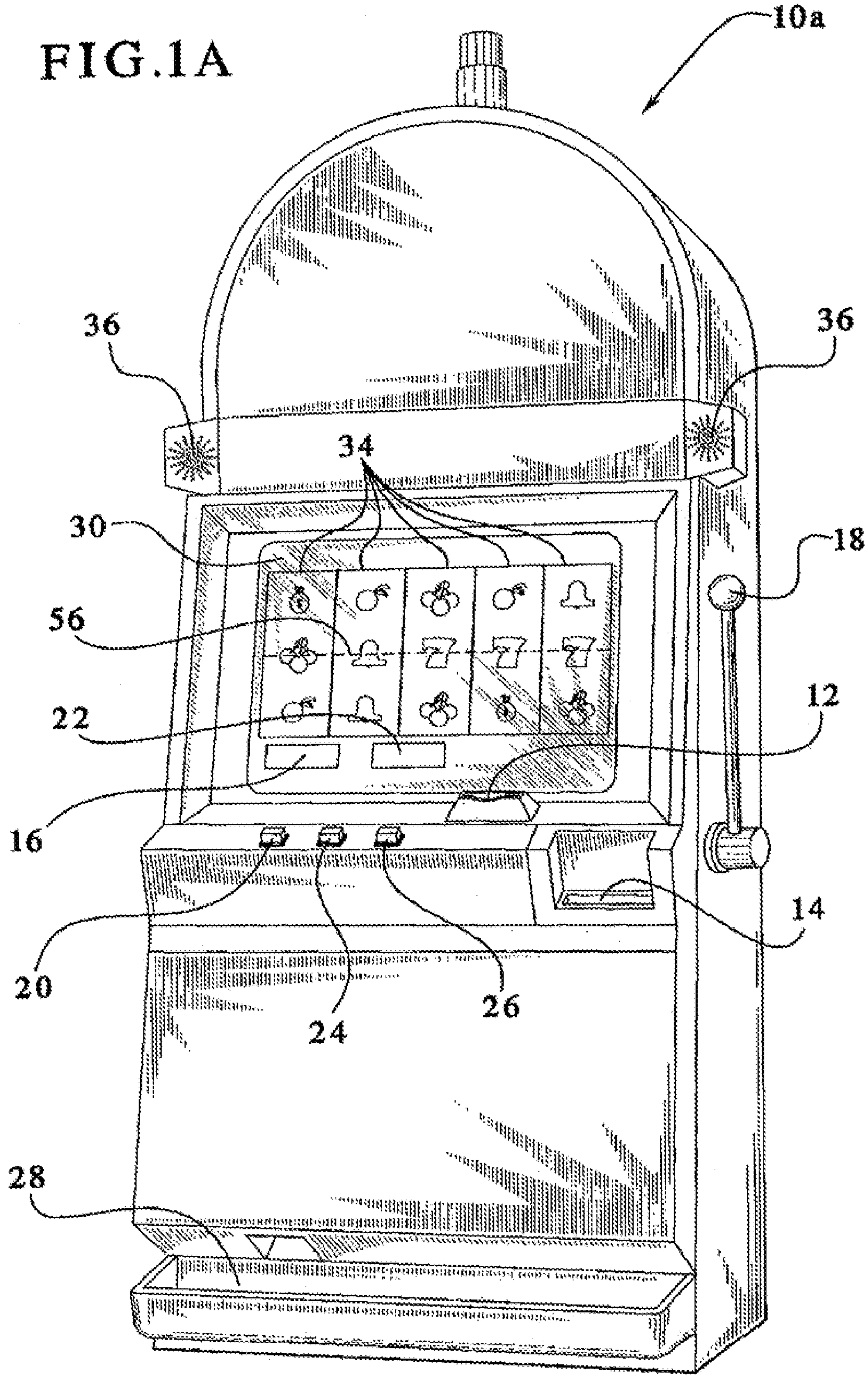
FIGS. 1A and 1B are perspective views of alternative embodiments of the wagering gaming device of the present invention.
Figure 1B:
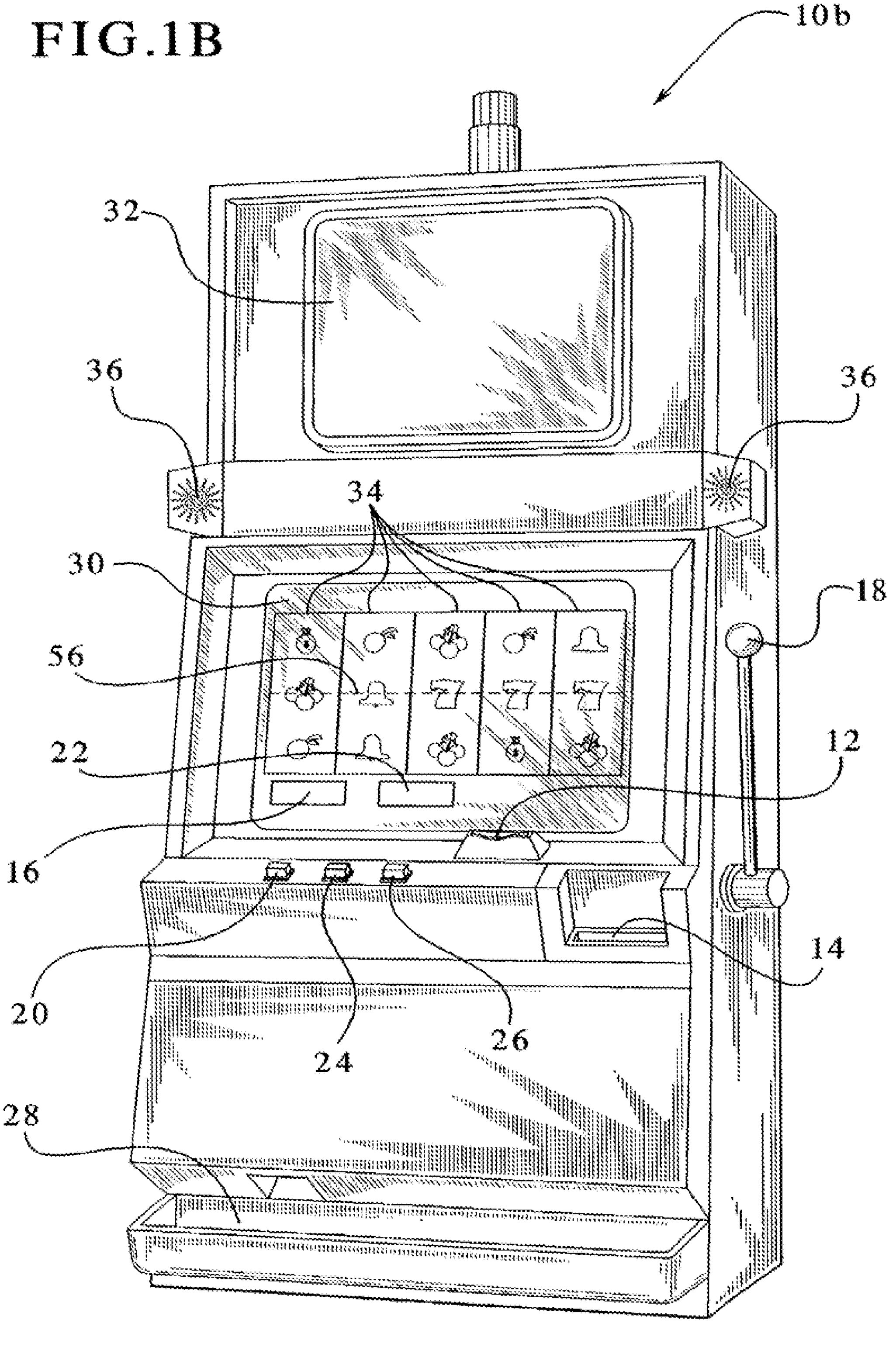

Referring now to the drawings, and in particular to FIGS. 1A and 1B, wagering gaming device 10*a* and wagering gaming device 10*b* illustrate two possible cabinet styles and display arrangements, collectively referred to herein as wagering gaming device 10. The present invention may include any primary or secondary game. The player can operate the wagering gaming device while standing or sitting. The wagering gaming device may alternatively be a pub-style or table-top game (not shown), which a player usually operates while sitting.

Referring now to the drawings, and in particular to FIGS. 1A and 1B, wagering gaming device 10*a* and wagering gaming device 10*b* illustrate two possible cabinet styles and display arrangements, collectively referred to herein as wagering gaming device 10. The present invention may include any primary or secondary game. The player can operate the wagering gaming device while standing or sitting. The wagering gaming device may alternatively be a pub-style or table-top game (not shown), which a player usually operates while sitting.

The wagering gaming device 10 includes monetary input devices. FIGS. 1A and 1B illustrate a coin slot 12 for coins or tokens and/or a payment acceptor 14 for cash money. The payment acceptor 14 may also include other devices for accepting payment such as readers or validators for credit cards, debit cards or smart cards, tickets, notes, etc. When a player inserts money in wagering gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the wagering gaming device 10.

As shown in FIGS. 1A and 1B, wagering gaming device 10 may also include a bet display 22 and a bet one button 24. The player may place a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. A player may cash out by pushing a cash out button 26 to receive coins or tokens in the coin payout tray 28, or receive other forms of payment, such as an amount printed on a ticket or credited to a credit card, debit card or smart card.

Wagering gaming device 10 may also include one or more display devices. The embodiment shown in FIG. 1A includes a central display device 30, and the alternative embodiment shown in FIG. 1B includes a central display device 30 as well as an upper display device 32. The display devices 30, 32 display any visual representation or exhibition, including video images. The display device 30, 32 includes any suitable viewing surface such as a video monitor or screen, a liquid crystal display or any other static or dynamic display mechanism. In a video poker, blackjack or other card gaming machine embodiment, the display device includes displaying one or more cards.

In a slot machine base game of wagering gaming device 10, the display device 30, 32 displays a plurality of reels 34 such as three to five reels 34 in video form on one or more of the display devices 30, 32. Each reel 34 displays a plurality of indicia such as bells, hearts, fruits, numbers, letters, bars or other images which preferably correspond to a theme associated with the wagering gaming device 10. Each base game, especially in the slot machine base game of the wagering gaming device 10, includes speakers 36 for making sounds or playing music.

Figure 2:
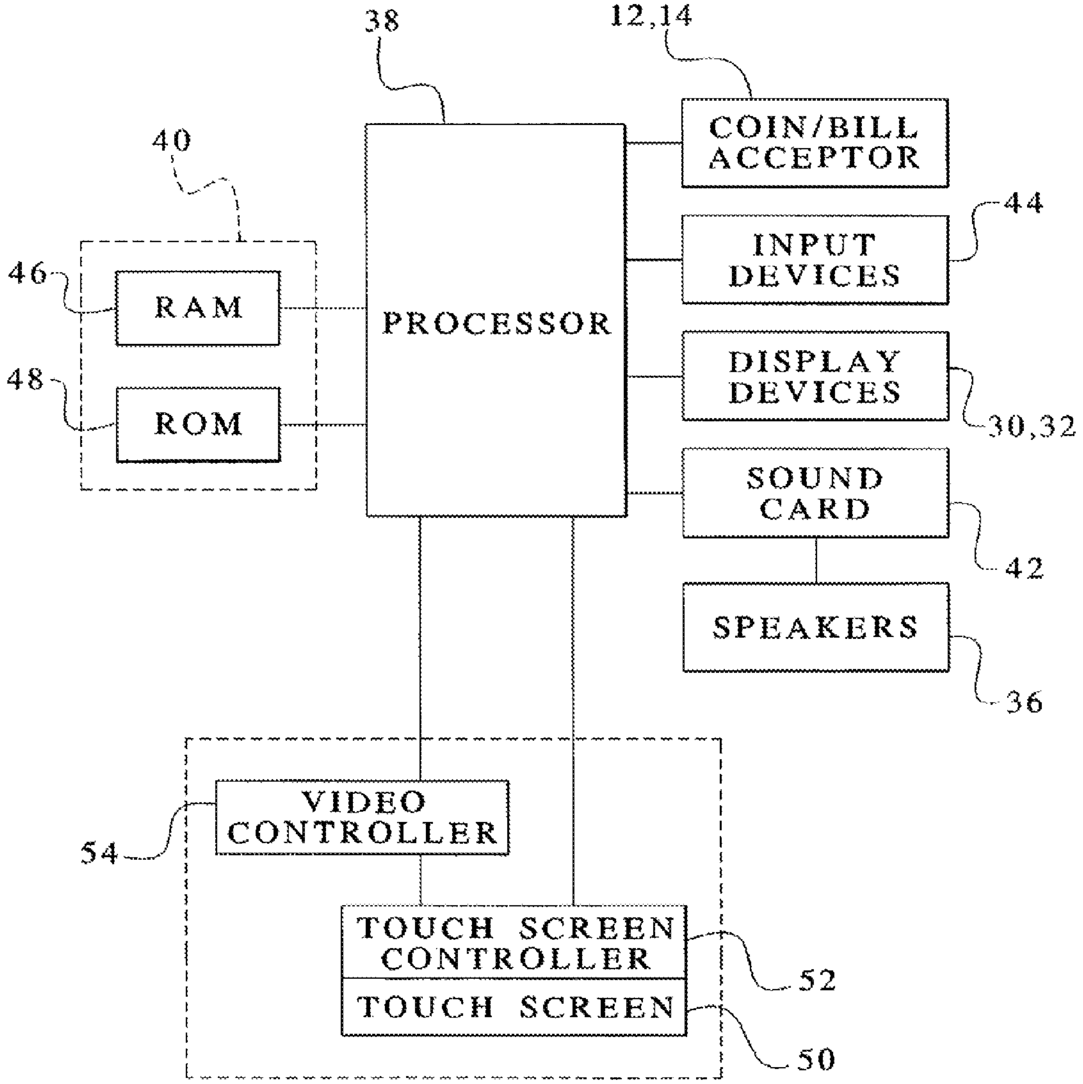
FIG. 2 is a schematic block diagram of the electronic configuration of one embodiment of the wagering gaming device of the present invention.

Referring now to FIG. 2, in a preferred embodiment, a general electronic configuration of the wagering gaming device described above includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of causing the display device 30, 32 to display images, symbols and other indicia such as images of people, characters, places, things and faces of cards. The memory device 40 includes random access memory (RAM) 46 for storing event data or other data generated or used during a particular game. The memory device 40 also includes read only memory (ROM) 48 for storing program code, which controls the wagering gaming device 10 so that it plays a particular game in accordance with applicable game rules and paytables. It should also be appreciated that a suitable harddrive may be used to store information in conjunction with the RAM and ROM memory devices.

As illustrated in FIG. 2, the player preferably uses the input devices 44 to input signals into wagering gaming device 10 and particularly the processor 38. In the slot machine base game, the input devices 44 include the pull arm 18, play button 20, the bet one button 24 and the cash out button 26. In one embodiment, one input device includes a touch screen 50 and touch screen controller 52 which are connected to a video controller 54 and processor 38. The touch screen 50 enables a player to input decisions into the wagering gaming device 10 by sending a discrete signal based on the area or coordinates of the touch screen 50 that the player touches or presses. In an alternative embodiment, the touch screen is mounted or positioned in front of a mechanical device and inputs of the touch screen cause (through the control of the processor) movement of the mechanical device as described below with respect to the other embodiments. The mechanical device maybe any suitable device such as one or more reels, wheels, dice or other objects or physically actuatable members. The outcome of the mechanical devices, as described below, is preferably randomly determined.

It should be appreciated that although a processor 38 and memory device 40 are preferable implementations of the present invention, the present invention can also be implemented using one or more application-specific integrated circuits (ASIC's), one or more hard-wired devices, or one or more mechanical devices (collectively and/or individually referred to herein as a "processor"). Furthermore, although the processor 38 and memory device 40 preferably reside in each wagering gaming device 10 cabinet, it is possible to provide some or all of their functions at a central location such as a network server for communication to a playing station such as over a local area network (LAN), wide area network (WAN), Internet connection, microwave link, and the like.

With reference to the slot machine base game of FIGS. 1A and 1B, to operate the wagering gaming device 10, the player inserts the appropriate amount of tokens or money in the coin slot 12 or the payment acceptor 14 and then pulls the arm 18 or pushes the play button 20. The reels 34 then begin to spin. Eventually, the reels 34 come to a stop. As long as the player has credits remaining, the player can spin the reels 34 again. Depending upon where the reels 34 stop, the player may or may not win additional credits.

In addition to winning base game credits, the wagering gaming device 10, including any suitable base game, may also include bonus games that give players the opportunity to win credits. The illustrated wagering gaming device 10 employs a video-based display device 30 or 32 for the bonus games. The bonus games include a program that automatically begins when the player achieves a qualifying condition in the base game. In the slot machine embodiment, the qualifying condition may include a particular symbol or symbol combination generated on a display device. As illustrated in the five reel slot game shown in FIGS. 1A and 1B, the qualifying condition includes the number seven appearing on three adjacent reels 34 along a payline 56.

Simulated Control of a Functional Game Element or Mechanical Functional Element

The present invention provides a wagering gaming device that enables a player to affect the movement of a functional game element or an mechanical functional element of the game by varying the type of movement of the input device. Despite the variance in movement of the functional game element or mechanical functional element in one embodiment of the present invention, the outcome of the game remains random. Although the result is random, the correlation between the player's actuation of the input device and the movement of the functional game element or mechanical functional element provides an increased level of player interaction with the wagering gaming machine.

The wagering gaming device includes a display device controlled by the processor. The display device displays a functional game element, such as a wheel, a reel, a card or a set of cards, a die or a set of dice or any other suitable functional game element. The wagering gaming device includes an input device in communication or operable to communicate with the processor. As described above, the input device in one embodiment of the present invention includes a touch screen which may be part of the display device. The player actuates the functional game element or the mechanical functional element through the use of the touch screen.

Figure 3:
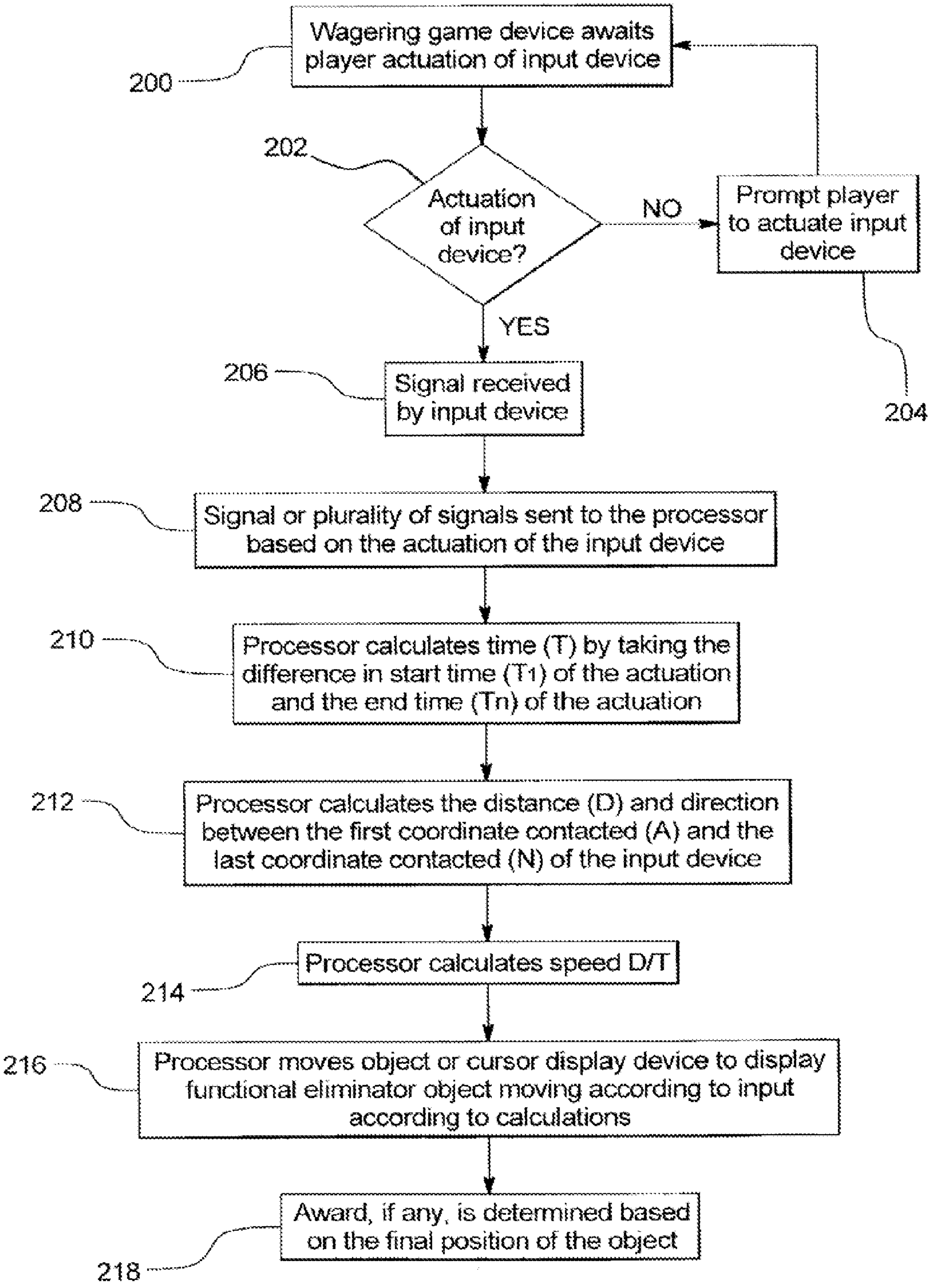
FIG. 3 is a flow diagram of a process of one embodiment of the present invention.

FIG. 3 illustrates a method of one embodiment of the present invention. In the first step upon a triggering event which causes employment of the present invention, the wagering gaming device awaits player interaction, as illustrated in block 200. It may or may not receive player actuation, as illustrated in diamond 202. If the wagering gaming device does not receive player activation, the gaming device can provide a prompt to the player, as illustrated in block 204, and it remains in an active state, as illustrated in block 200. If it does receive player activation, the input device receives at least one and preferably a plurality of signals as illustrated in block 206. The signal(s) may be inputted by actuation of, activation of (including voice activation of), movement of or contact with the input device. A signal or a plurality of signals are sent to the processor based on the actuation of the input device, as illustrated by block 208. The processor calculates different parameters from the received signals. In one embodiment, the processor calculates time (T) by measuring the difference in the time of the first coordinate contacted ($T_1$) and the time of the last coordinate contacted (Tn), as illustrated in block 210. The processor also determines the length and distance of actuation, as illustrated in block 212. The processor calculates the distance (D) between the first coordinate contacted (A) and the last coordinate contacted (N). The processor calculates the speed by dividing the distance (D) by the time (T), as illustrated in block 214. The processor moves the functional game element or mechanical functional element according to these parameters, as illustrated by block 216. In one embodiment, the processor determines the result, if any, based on the final position of the functional game element or mechanical functional element, as illustrated in block 218.

Figure 4A:
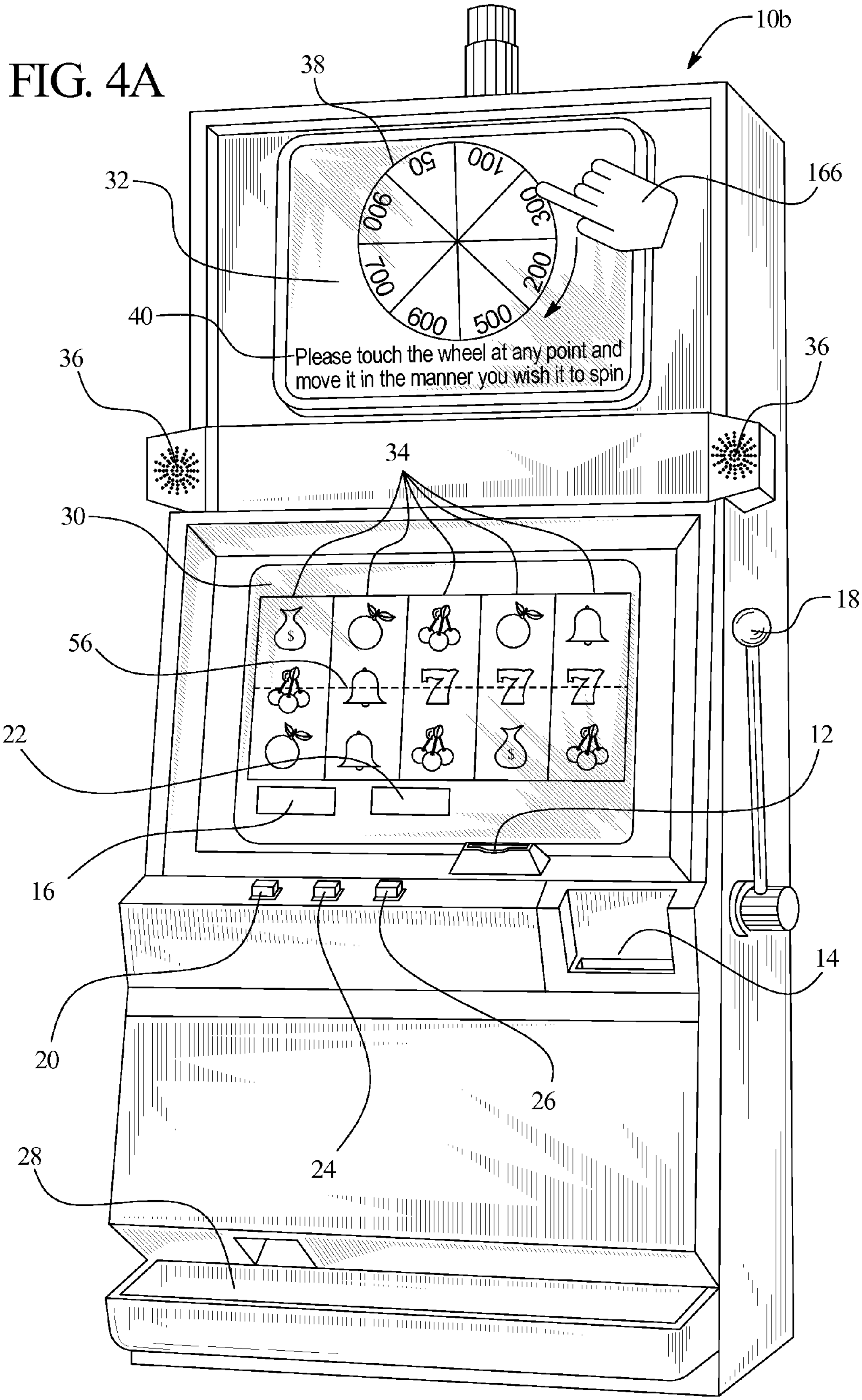
FIG. 4A is a perspective view of a wagering gaming device with the display device including a display device displaying a wheel, which is actuated by contact with the touch screen.
Figure 4B:
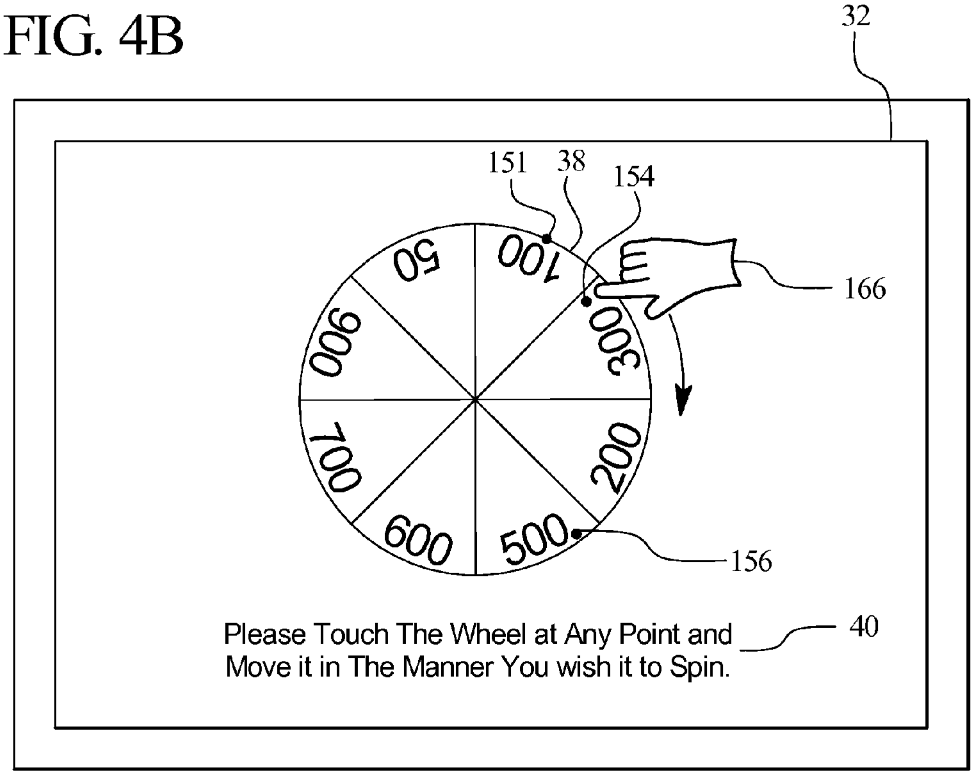
FIGS. 4B and 4C are front plan views of the display device of the embodiment of FIG. 4A, displaying a wheel and the movement of a hand to move the wheel.
Figure 4C:
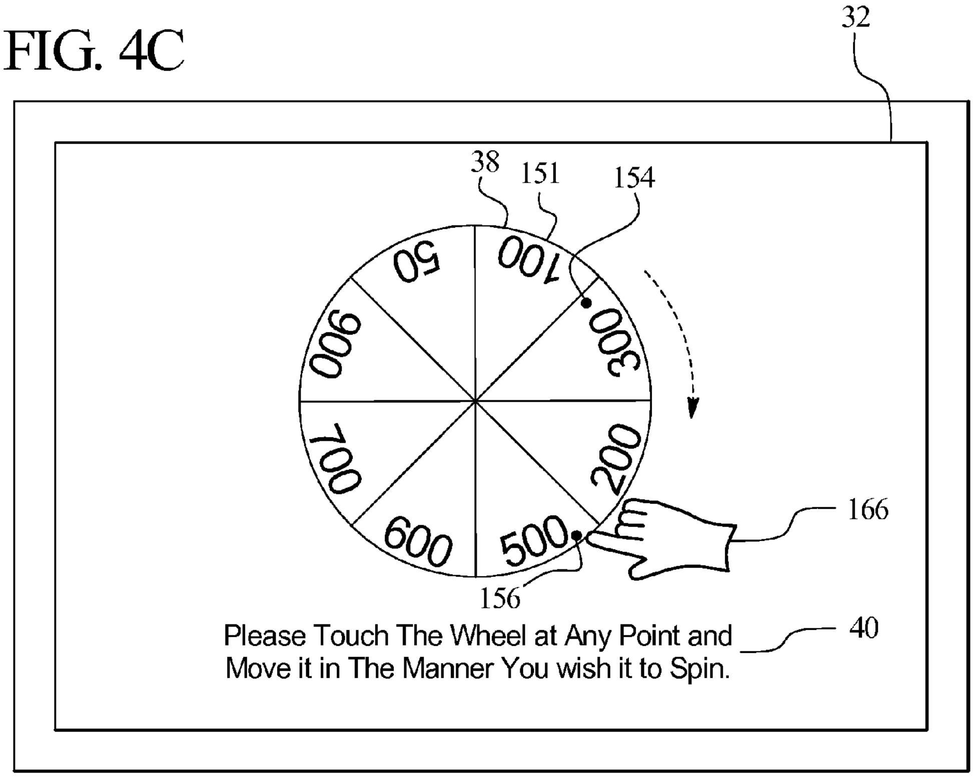

In one embodiment, a display device includes a touch screen which displays a functional game element. In this example, the functional game element is a video wheel 38, as illustrated in FIGS. 4A, 4B and 4C. The display device also displays instructions 40 on how to use the wagering gaming device. The touch screen includes a uniform electric field. Voltage is applied to the four corners of the touch screen, spreading out voltage across the screen. The touch of a member, such as a finger, to the touch screen creates an electric current from each side of the screen. The touch screen is connected to and communicates with the processor of the wagering gaming device via a touch screen controller (see FIG. 2). The touch screen controller detects any such contact with the touch screen and determines the contacted coordinates. The touch screen controller sends a signal or plurality of signals to the processor that represent the contacted coordinates. The processor calculates and determines the type of contact the player has with the touch screen, as described above.

For example, the player can touch the wheel 151 with a member, such as the player's finger 166 at point 154, and drag the member downward towards the bottom of the wheel to point 156, as illustrated in FIGS. 4B and 4C. The signals from the touch screen are sent to the processor by the touch screen controller. The processor calculates the parameters of the movement and sends a signal to the display device causing the wheel to spin based on the parameters. The amount, speed and direction of rotations of the wheel are determined by the speed and direction of contact with the touch screen. For example, if the player contacts point 154 with a member 166, as illustrated in FIG. 4*b*, and moves the member rapidly from 154 to 156, as illustrated in FIG. 4C, the wheel will spin rapidly in a clockwise, downward direction. In one embodiment, the game is played in a conventional manner with the outcome being randomly determined independent of the speed of movement of the video wheel.

In another embodiment, the player can affect the length of time the wheel spins after it begins spinning. After the wheel has begun spinning, the player can reposition the member on the touch screen in the area in which the wheel is displayed on the display device. The processor interprets this action as a command to stop or slow the rotation of the wheel.

In another embodiment, the player can contact the touch screen in the area where the display device displays the wheel spinning in a clockwise direction and move the member in a clockwise direction to send a command to the processor to speed up the wheel or make it spin longer. The outcome of the game, however, is not based on the stopping, slowing down or lengthening of the rotation of the wheel, but is randomly determined. It should be appreciated that the wheel is not limited to spinning in a clockwise direction. The wheel is able to spin in any suitable direction in which the member is moved. This embodiment may be used in combination with other embodiments of the present invention.

Figure 5A:
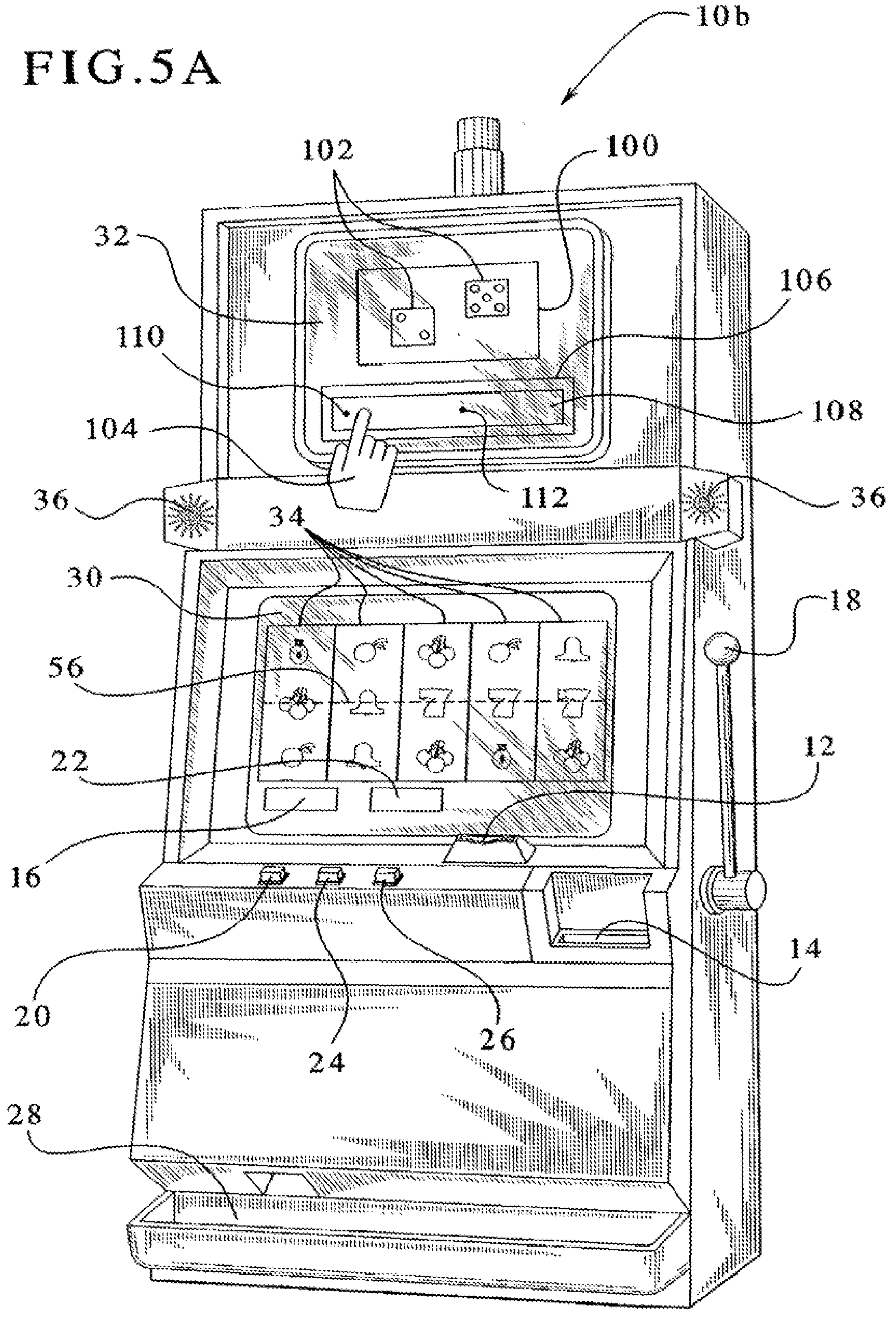
FIG. 5A is a perspective view of a wagering gaming device with the display device displaying a video image of a pair of dice which is actuated by contact with the touch screen.
Figure 5B:
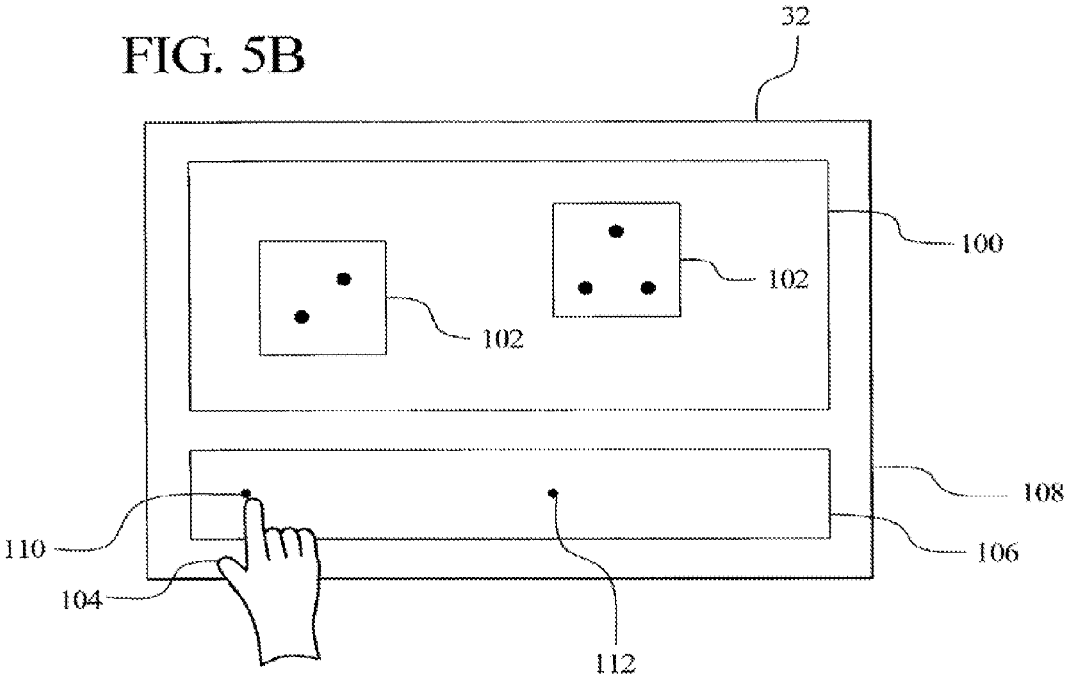
FIGS. 5B and 5C are front plan views of the display device of the embodiment of FIG. 5A, displaying the dice and the movement of a hand to roll the dice.
Figure 5C:
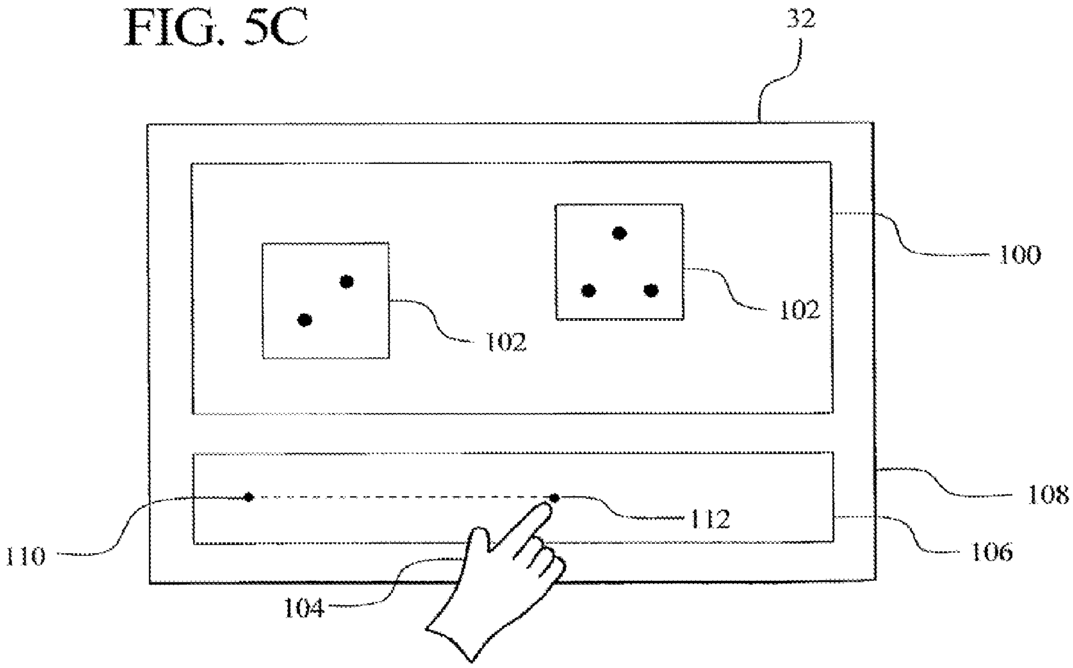

In an alternative embodiment of the present invention, the wagering gaming device has a display device 32 which includes a video image 100 and a touch screen 106, as illustrated in FIG. 5A. The video image contains at least one functional game element. In this example, the functional game element are dice 102. However, it should be appreciated that the video image may be any suitable functional game element. The speakers 36 emit auditory instructions to the player on how to activate the functional game element. The player contacts the touch screen with a member, such as the player's finger 104. The touch screen in this example includes an indicator strip 108. The player places the member along the indicator strip and contacts the indicator strip in the manner in which the player would like the dice to be rolled. The touch screen controller sends a signal or a plurality of signals to the processor. The processor determines the parameters of the actuation and sends a signal to the display device to move the functional game element in accordance with the player input. For example, if the player wants to move the dice slowly, gently and for less time, the player places a member, such as the player's finger 104 on a point 110 on the indicator strip, as illustrated in FIG. 5B. He or she lightly presses on the strip and slowly moves his finger to point 112, as illustrated in FIG. 5C. The dice on the video image are rolled slowly, gently and for a shorter period of time. In one embodiment, the outcome of the game is randomly determined despite the movement made to actuate the dice.

Figure 6:
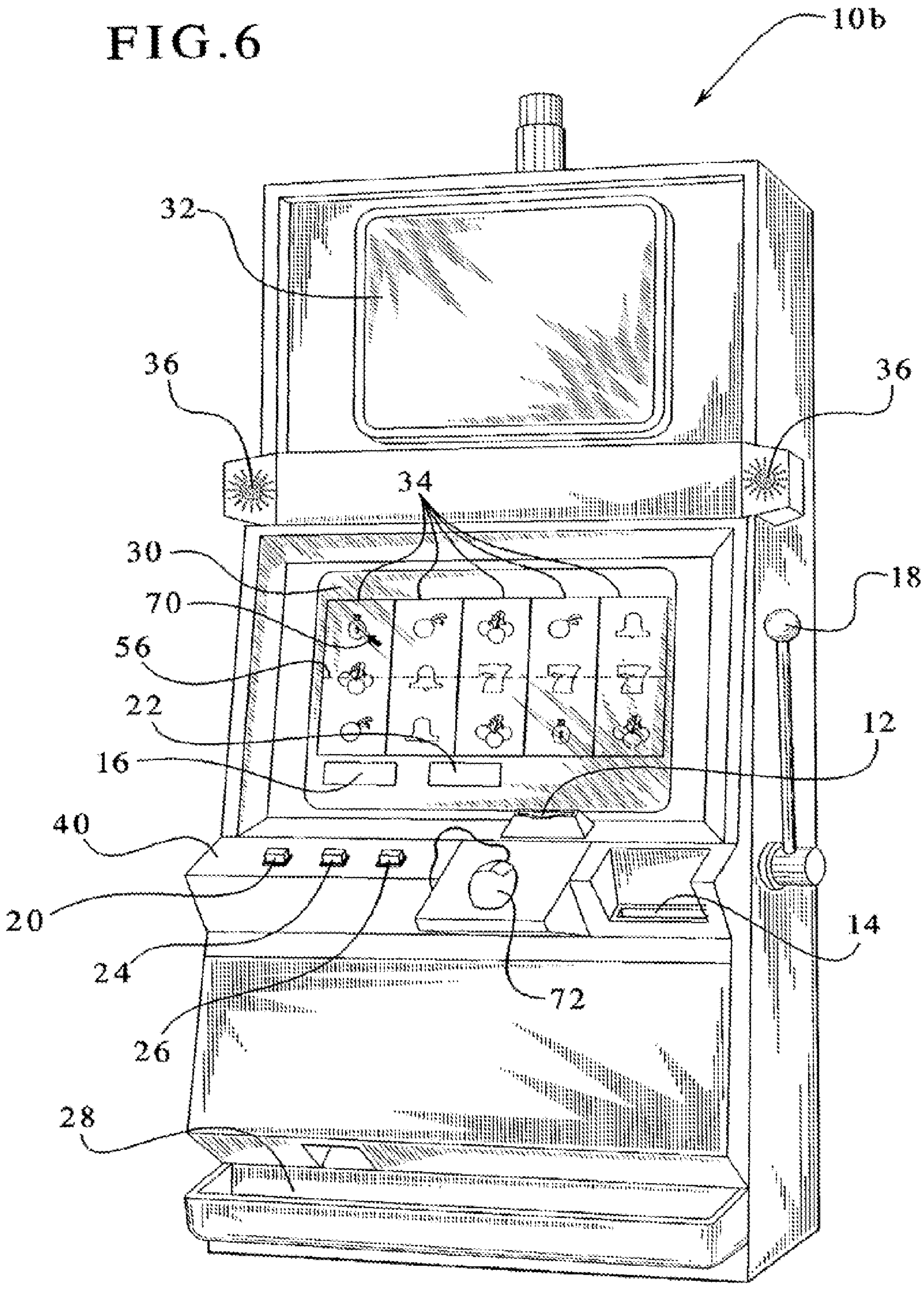
FIG. 6 is a perspective view of a wagering gaming device with a mouse which actuates the reels upon contact.
Figure 7A:
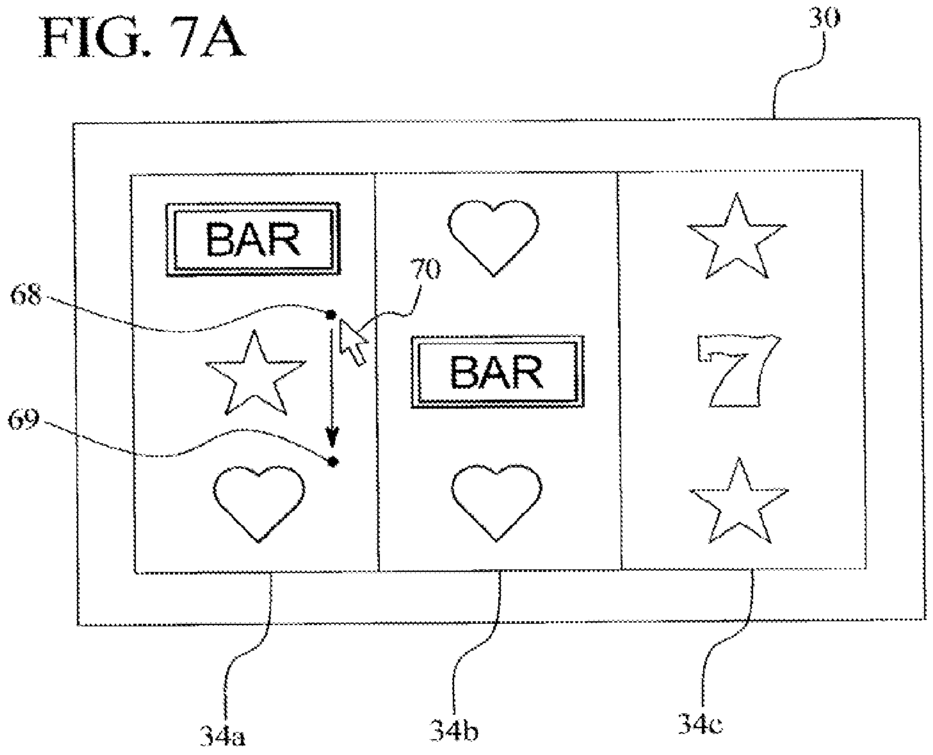
FIGS. 7A and 7B are front plan views of a display device displaying reels with a mouse, represented by the arrow, which actuates the reels upon contact.
Figure 7B:
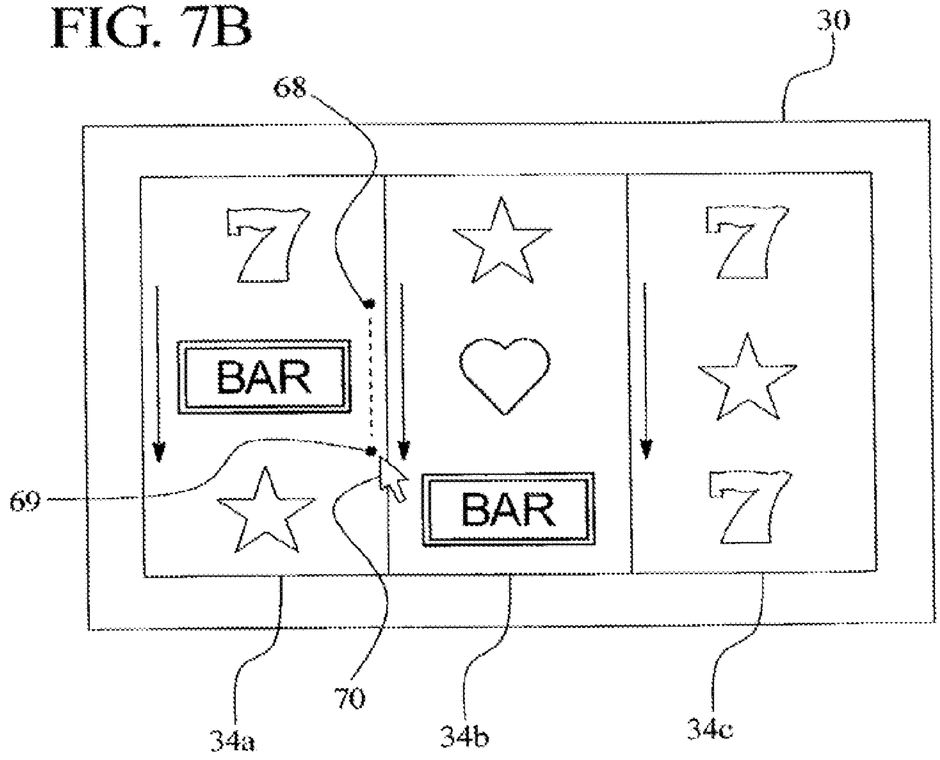

In one embodiment, the input device is represented by functional game element on the display screen. In one example of this embodiment, a display device 30 has a set of X-Y coordinates and displays a set of reels, as illustrated in FIG. 6. The panel 40 includes a mouse 72. The display device displays a cursor 70 representing the position of the mouse 72 on the display device 30 relative to the video image of the reels 34*a* to 34*c* as illustrated in FIGS. 7A and 7B. The player positions the mouse 72 such that the cursor 70 is positioned on the first reel, preferably at the top of the first reel 34*a*, as illustrated in FIGS. 7A and 7B. The player then presses the appropriate button on the mouse 72 to send a signal to the processor that the mouse 72 is contacting a first coordinate 68 of the display device 30 which both the image and cursor 70 occupy, as illustrated in FIG. 7A. The player then drags the mouse 72 downward, to lower point on the reel 69, while keeping the button pressed, thereby contacting the coordinates in between points 68 and 69, as illustrated by FIGS. 7A and 7B. The processor calculates the parameters of the movement and causes the reels 34*a* to 34*c* to spin in a manner consistent with the movement of the mouse. In one embodiment, the eventual outcome of the game, however, is randomly determined despite the type of movement used to actuate the reels.

In another example, the player may affect the speed of the reels once they begin spinning. The player may discontinue pressing the button, reposition the cursor on the display device in the area where the reels are displayed, and then press the button again. This sends a signal to the processor to stop or slow the reel. In one embodiment, the player can discontinue pressing the button, reposition the cursor on the display device in the area in which the reels are displayed, press the button again, and move the mouse in a direction opposite to the direction of movement which caused the spinning of the reel. This actuation also sends a signal to the processor to stop or slow the rotation of the reel. This does not, however, affect the randomness of the outcome.

In one embodiment, the wagering gaming device has a mechanical functional element that is located in the top box of the cabinet or remote from the display device. The mechanical functional element is connected to, in communication with or controlled by the processor. The processor is connected to, in communication with or in control of at least one input device. The player uses the input device to send a signal to the processor. The processor calculates the speed, direction and pressure of the actuation, as explained above. The processor then actuates the mechanical functional element in correlation to the signals sent by the input device.

Figure 8:
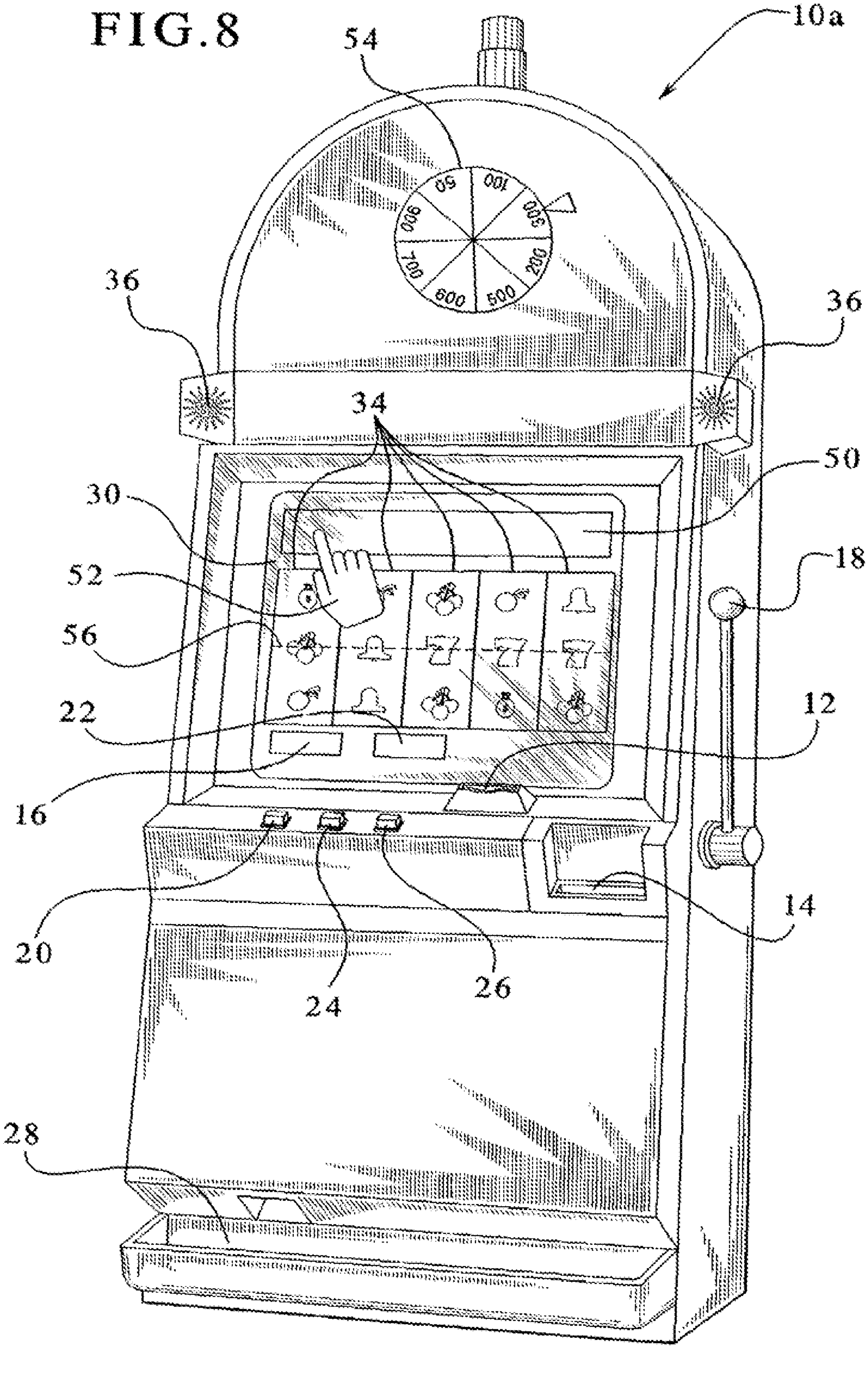
FIG. 8 is a perspective view of a wagering gaming device including a mechanical wheel mounted on the top box which is actuated by contact with the touch screen.

For example, a mechanical wheel 54 is mounted on the top box of the wagering gaming device, as illustrated in FIG. 8. The mechanical wheel 54 is connected to the processor of the wagering gaming device. A touch screen 50 is located on the wagering gaming device. In this example, it is located on the central display device 30. The touch screen 50 is in the form of a strip similar to that in an above example. Using a member, the player contacts a first coordinate and moves the member along the strip. While maintaining contact with the touch screen, the player drags the member along the touch screen through the coordinates. The processor receives a signal or a plurality of signals from the touch screen controller. The processor moves the wheel in correlation to these calculations. In alternative embodiments, the player uses an input device such as a mouse, light pen, button, touch pad, or keyboard to spin the wheel.

Thus, the present invention also contemplates that the pressure can be the input and that the rate and/or quantity can be the input. It should also be appreciated than an arc or angular movement could be the input used by the processor to determine the moment of the mechanical or video functional element. In an alternative embodiment of the present invention, a slidable, pivotal, rotatable or other such member such a hammer or mallet is provided to enable the player to input signals to the processor. For instance, in the hammer embodiment, the processor determines the input based on how hard or how many times a player hits a target with the hammer.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A wagering gaming device comprising:

a housing; a video display device supported by the housing;

a plurality of input devices supported by the housing, said input devices including a touch screen disposed in front of the video display device;

a processor; and a memory device which stores a plurality of instructions, which when executed by the processor, cause the processor to operate with the video display device, and the plurality of input devices including the touch screen, to:

(i) receive a wager from a player;

(ii) after receiving the wager, cause the video display device to display a plurality of video reels spinning and then cause the video display device to display the plurality of video reels stopped to display a randomly determined outcome;

(iii) randomly determine a section of a plurality of different sections of a video wheel to indicate, said indication of said randomly determined section occurring after said video wheel moves, wherein a result is associated with the randomly determined section;

(iv) cause the video display device to display instructions to the player to inform the player how the player is to actuate the touch screen to control a direction of movement of the video wheel from a plurality of different directions;

(v) after the player actuates the touch screen to control the direction of movement of the video wheel, cause the video display device to display the video wheel moving and then cause the video display device to display the video wheel stopped to indicate the randomly determined section, wherein direction of the movement of the video wheel to indicate the randomly determined section is at least in part based on a determination of a direction at which the player actuates the touch screen; and (vi) provide the result associated with the randomly determined section to the player.

2. The wagering gaming device of claim 1, wherein the determination of the direction at which the player actuates the touch screen is based on a direction from a first touch of the touch screen by the player to a second touch of the touch screen by the player.

3. The wagering gaming device of claim 1, wherein the determination of the direction at which the player actuates the touch screen is based on a direction from a first coordinate on the touch screen touched by the player to another different coordinate on the touch screen touched by the player.

4. The wagering gaming device of claim 1, wherein the displayed movement of the video wheel to indicate the randomly determined section is also at least in part based on a determination of how fast the player actuates the touch screen.

5. A wagering gaming device comprising:

a housing; a video display device supported by the housing;

a plurality of input devices supported by the housing, said input devices including a touch screen disposed in front of the video display device;

a processor;

and a memory device which stores a plurality of instructions, which when executed by the processor, cause the processor to operate with the video display device, and the plurality of input devices including the touch screen, to:

(i) receive a wager from a player;

(ii) after receiving the wager, cause the video display device to display a plurality of video reels spinning and then cause the video display device to display the plurality of video reels stopped to display a randomly determined outcome;

(iii) randomly determine a section of a plurality of different sections of a video wheel to indicate, said indication of said randomly determined section occurring after said video wheel moves, wherein a result is associated with the randomly determined section;

(iv) cause the video display device to display instructions to the player to inform the player how the player is to actuate the touch screen to control a speed of movement of the video wheel from a plurality of different speeds;

(v) after the player actuates the touch screen to control the speed of movement of the video wheel, cause the video display device to display the video wheel moving and then cause the video display device to display the video wheel stopped to indicate the randomly determined section, wherein the movement of the video wheel to indicate the randomly determined section is based at least in part on a determination of how fast the player actuates the touch screen; and (vi) provide the result associated with the randomly determined section to the player.

6. The wagering gaming device of claim 5, wherein the determination of how fast the player actuates the touch screen is based on an amount of time between the player touching the touch screen at a first point and the player touching the touch screen at a second different point.

7. The wagering gaming device of claim 5, wherein the determination of how fast the player actuates the touch screen is based on an amount of time between the player touching the touch screen at a first actuation location and the player touching the touch screen at a second different actuation location.

8. The wagering gaming device of claim 5, wherein the determination of how fast the player actuates the touch screen is based on an amount of time between the player touching one coordinate on the touch screen and another different coordinate on the touch screen.

9. The wagering gaming device of claim 5, wherein the movement of the video wheel to indicate the randomly determined section is also at least in part based on a determination of a direction at which the player actuates the touch screen.

10. A method of operating a wagering gaming device including a video display device and a plurality of input devices including a touch screen disposed in front of the video display device, said method comprising:

(i) receiving a wager from a player;

(ii) after receiving the wager, causing the video display device to display a plurality of video reels spinning and then causing the video display device to display the plurality of video reels stopped to display a randomly determined outcome;

(iii) randomly determining a section of a plurality of different sections of a video wheel to indicate, said indication of said randomly determined section occurring after said video wheel moves, wherein a result is associated with the randomly determined section;

(iv) causing the video display device to display instructions to the player to inform the player how the player is to actuate the touch screen to control a direction of movement of the video wheel from a plurality of different directions;

(v) after the player actuates the touch screen to control the direction of movement of the video wheel, causing the video display device to display the video wheel moving and then causing the video display device to display the video wheel stopped to indicate the randomly determined section, wherein direction of the movement of the video wheel to indicate the randomly determined section is at least in part based on a determination of a direction at which the player actuates the touch screen; and (vi) providing the result associated with the randomly determined section to the player.

11. The method of claim 10, wherein the determination of the direction at which the player actuates the touch screen is based on a direction from a first touch of the touch screen by the player to a second touch of the touch screen by the player.

12. The method of claim 10, wherein the determination of the direction at which the player actuates the touch screen is based on a direction from a first coordinate on the touch screen touched by the player to another different coordinate on the touch screen touched by the player.

13. The method of claim 10, wherein the movement of the video wheel to indicate the randomly determined section is also at least in part based on a determination of how fast the player actuates the touch screen.

14. A method of operating a wagering gaming device including a video display device and a plurality of input devices including a touch screen disposed in front of the video display device, said method comprising:

(i) receiving a wager from a player;

(ii) after receiving the wager, causing the video display device to display a plurality of video reels spinning and then causing the video display device to display the plurality of video reels stopped to display a randomly determined outcome;

(iii) randomly determining a section of a plurality of different sections of a video wheel to indicate, said indication said randomly determined section occurring after said video wheel moves, wherein a result is associated with the randomly determined section;

(iv) causing the video display device to display instructions to the player to inform the player how the player is to actuate the touch screen to control a speed of movement of the video wheel from a plurality of different speeds;

(v) after the player actuates the touch screen to control the speed of movement of the video wheel, causing the video display device to display the video wheel moving and then causing the video display device to display the video wheel stopped to indicate the randomly determined section, wherein the movement of the video wheel to indicate the randomly determined section is based at least in part on a determination of how fast the player actuates the touch screen; and (vi) providing the result associated with the randomly determined section to the player.

15. The method of claim 14, wherein the determination of how fast the player actuates the touch screen is based on an amount of time between the player touching the touch screen at a first point and the player touching the touch screen at a second different point.

16. The method of claim 14, wherein the determination of how fast the player actuates the touch screen is based on an amount of time between the player touching the touch screen at a first actuation location and the player touching the touch screen at a second different actuation location.

17. The method of claim 14, wherein the determination of how fast the player actuates the touch screen is based on an amount of time between the player touching one coordinate on the touch screen and another different coordinate on the touch screen.

18. The method of claim 14, wherein the movement of the video wheel to indicate the randomly determined section is also at least in part based on a determination of a direction at which the player actuates the touch screen.

* * * * *

UNITED STATES PATENT AND TRADEMARK OFFICE

CERTIFICATE OF CORRECTION

PATENT NO. : 8,075,384 B2
APPLICATION NO. : 12/835478
DATED : December 13, 2011
INVENTOR(S) : Aaron T. Jones et al.

It is certified that error appears in the above-identified patent and that said Letters Patent is hereby corrected as shown below:

Claim 1, column 10, line 59, after "wherein" add --a--.

Claim 4, column 11, line 10, delete "displayed".

Claim 10, column 12, line 30, after "wherein" add --a--.

Claim 14, column 12, line 61, before "said" add --of--.

Signed and Sealed this
Twenty-sixth Day of June, 2012

David J. Kappos
*Director of the United States Patent and Trademark Office*